United States Patent [19]
Friedrich et al.

[11] Patent Number: 5,799,705
[45] Date of Patent: Sep. 1, 1998

[54] FIRE RESISTANT PIPE

[75] Inventors: Ralph S. Friedrich, Hermosa Beach; John F. Kane, Woodland Hills; Mark H. Fortune, Whittier, all of Calif.

[73] Assignee: Ameron International Corporation, Pasadena, Calif.

[21] Appl. No.: 548,226

[22] Filed: Oct. 25, 1995

[51] Int. Cl.⁶ .................................................. F16L 9/14
[52] U.S. Cl. ......................... 138/144; 138/140; 138/141; 138/DIG. 2; 138/DIG. 7; 428/36.4; 428/36.71
[58] Field of Search ........................... 138/144, 129, 138/140, 141, 137, 177, DIG. 2, DIG. 7; 428/36.2, 36.4, 36.91

[56] References Cited

U.S. PATENT DOCUMENTS

| | | | |
|---|---|---|---|
| 3,706,615 | 12/1972 | Nishiyama et al. | 156/169 |
| 3,874,972 | 4/1975 | Wesgh | 156/169 |
| 4,053,447 | 10/1977 | Shea | 260/38 |
| 4,076,873 | 2/1978 | Shea | 428/35 |
| 4,080,999 | 3/1978 | Bulters et al. | 138/125 |
| 4,107,127 | 8/1978 | Shea | 260/38 |
| 5,084,314 | 1/1992 | Igarashi et al. | 428/36.2 |
| 5,091,230 | 2/1992 | Fuchs et al. | 428/36.4 |
| 5,364,908 | 11/1994 | Oishi et al. | 525/64 |
| 5,383,994 | 1/1995 | Shea | 156/175 |
| 5,552,185 | 9/1996 | DeKeyser | 428/36.5 X |
| 5,585,155 | 12/1996 | Heikkila et al. | 428/36.7 |

*Primary Examiner*—Patrick F. Brinson
*Attorney, Agent, or Firm*—Christie, Parker & Hale, LLP

[57] ABSTRACT

Fire resistant pipes and pipe fittings include a structural pipe wall formed from helically wound reinforcing fiber that is bonded together with a thermoset polymer resin selected from the group consisting of phenolic resins, siloxane-modified phenolic resins, furan resins, and mixtures thereof. In a first embodiment, a resin rich fire resistant layer is applied to the surface of the structural pipe wall. The carrier is capable of accommodating a large amount of resin. The resin used to impregnate the carrier is selected from the same group of resins used to form the structural pipe wall. It is desired that both resins be compatible, and preferably be the same, to facilitate forming a bond between the structural pipe wall and the fire resistant layer during cure. In a second embodiment, a number of energy absorbing material layers are disposed around the structural pipe wall, and are formed from a material capable of absorbing heat energy from a surrounding outside layer to produce a thermally insulating gas therebetween. A number of fiber-reinforced resin layers are disposed around the absorbing material layers. The fire resistant layer and energy absorbing material layers are formed having sufficient wall thickness to protect the structural wall from heat induced failure produced by exposing the outermost pipe wall to a 1,000 ° C. flame for at least five minutes in a dry condition.

27 Claims, 3 Drawing Sheets

FIRE RESISTANT PIPE

FIELD OF THE INVENTION

The present invention relates generally to fire resistant pipe and pipe fittings and, more particularly, to a filament wound fiber-reinforced pipe and pipe fittings having one or more surrounding fiber-reinforced resin impregnated layers, which display enhanced fire resistance, burst strength, and impact resistance when compared with conventional fiber-reinforced pipes and pipe fittings.

BACKGROUND OF THE INVENTION

Pipes and pipe fittings formed from fiber-reinforced plastics have gained widespread acceptance as viable alternatives to their steel counterparts in such applications where cost, weight, and/or chemical resistance is a concern. Conventional fiber-reinforced plastic pipes include a filament component that is wound on a mandrel, and a resin component that is used to bond the filament windings together. The filament winding acts to structurally reinforce the otherwise resin pipe by providing a desired degree of hoop and longitudinal strength to the pipe. The fiber and resin components are selected for one or more desired physical properties, making the pipe particularly adapted to a specific application. Polyester and epoxy resins are typically favored for use in forming such pipes and pipe fittings because of their good weatherability, corrosion, and chemical resistance.

Fiber-reinforced plastic pipes and pipe fittings are used in applications where some degree of temperature resistance is desired as well as weather, corrosion and chemical resistance. An example of one such application is fire fighting piping that is used in industrial plants, offshore platforms and the like. Typically, pipes and pipe fittings used in fire fighting piping must be designed to accommodate and deliver a desired pressure of water, or other fire fighting liquid, foam, or foam/liquid mixture, when subjected to high temperature conditions or when placed in close flame vicinity. Fiber-reinforced plastic pipes are favored for use as fire fighting piping on off-shore oil platforms and are typically maintained in an empty or uncharged state until a fire is detected. Once a fire is detected, water is routed to the pipes at pressures that can be as high as 225 psig (16 Kfg/cm$^2$), depending on the rated pressure for the pipe. Accordingly, fiber-reinforced pipes that are used in such applications must be able to withstand an elevated temperature and/or close flame contact for a brief period of time when empty, i.e., without the benefit of being charged with water and having the water act as a heat transfer medium to minimize detrimental temperature effects.

Fiber-reinforced plastic pipes used in such fire fighting pipe applications include those made from epoxy resin because of their enhanced corrosion resistance. A rigorous test has been devised to qualify fiber-reinforced pipes for use in such fire fighting pipe applications. The test requires placing the pipe and pipe fitting assembly in close vicinity to a 1,000° C. flame with the pipe dry for a period of five minutes, and then filling the pipe with water at a rated pressure for approximately twenty minutes. To pass the test, the pipe and pipe fittings assembly must not show any signs of structural damage and only minor leakage. Fiber-reinforced plastic pipes and pipe fittings formed from epoxy resin have been shown to display significant temperature induced deterioration at temperatures as low as 120° C. and, therefore, have proven incapable of passing the test. Fiber-reinforced pipes and pipe fittings formed from polyester resin are equally incapable of passing the test, as these pipes have been demonstrated significant temperature induced deterioration at temperatures as low as 94° C.

In order to pass the test, fiber-reinforced plastic pipes formed from epoxy resin can be coated with an intumescent coating, or formed from an intumescent containing epoxy resin. When exposed to high-temperature conditions or flame contact, the intumescent coating foams, forming a temperature insulating barrier that serves to protect the underlying pipe surface. However, a disadvantage of using an intumescent coating is that it increases the expense of the fiber-reinforced plastic pipe, thereby reducing the cost incentive for using the pipe, and generates toxic smoke when subjected to flame contact.

An alternative for using intumescent coated fiber-reinforced epoxy pipes in fire fighting pipe applications is to construct the pipe from phenolic rather than epoxy resin, which is known to provide enhanced temperature resistance. However, fire fighting pipes and pipe fittings made from fiber-reinforced phenolic resin have also been found to be incapable of passing the test, displaying fiber rupture induced side wall failures when exposed to rated pressures.

Fiber-reinforced plastic pipes formed from epoxy, polyester and phenolic resins are known to display a limited amount of impact resistance and flexibility. Physical properties of impact resistance and flexibility are desired in applications such as fire fighting piping and pipe fittings because it is desired that such piping remain capable of retaining a rated water pressure even when subjected to some amount of movement, possibly created by falling, failing or distorting adjacent structures during a fire.

It is, therefore, desired that fiber-reinforced resin pipe and pipe fittings be constructed that are lightweight, weatherable, corrosion resistant, chemical resistant, and have sufficient burst strength and temperature resistance to pass the above-described test for use in fire fighting pipe applications. It is desired that the fiber-reinforced resin pipe not produce toxic smoke when exposed to flame contact, and provide a desired degree of both impact resistance and flexibility. It is also desired that the fiber-reinforced resin pipe be formed from available materials using conventional manufacturing techniques.

SUMMARY OF THE INVENTION

There is, therefore, provided in the practice of this invention fire resistant pipes and pipe fittings that are constructed having sufficient temperature and flame contact resistant to permit their use in such high-temperature applications as fire fighting piping. Fire resistant pipes prepared according to principles of this invention include a structural pipe wall formed from helically wound reinforcing fiber that is bonded together with a thermoset polymer resin. The polymer resin is selected from the group consisting of phenolic resins, siloxane-modified phenolic resins, furan resins, and mixtures thereof. The helically wound reinforcing fiber is wetted by the resin so that it comprises in the range of from about 10 to 40 percent by weight resin. The structural wall is formed from multiple layers of the windings, wherein the number of layers depend on such factors as the desired hoop and longitudinal strength, and temperature resistance desired for a particular pipe application.

In a first embodiment, a fire resistant layer is applied to the surface of the structural pipe wall. The fire resistant layer is a resin rich layer that acts as a heat ablative shield. The fire resistant layer includes a carrier adapted to accommodate a large amount of a thermosetting polymer resin. The carrier is selected from the group of fibrous mat-like materials that include glass fiber, carbon fiber, nylon fiber, polyester fiber, similar fiber felts, chopped fibers, and combinations thereof. The resin component is selected from the same group of resins previously described for forming the structural pipe wall. It is desired that both resins be compatible, and preferably be the same, to facilitate forming a chemical bond between the structural pipe wall and the fire resistant layer during cure. The fire resistant layer comprises about three times the resin content of the helically wound reinforcing fiber layer.

In a second embodiment, a number of energy absorbing material layers are disposed around a surface of the structural wall. The energy absorbing material used to form the layers is selected from the group of materials capable of absorbing heat energy from an outside surrounding layer by phase transformation, e.g., to produce a gas, below a degradation temperature of the structural wall. The gas formed by such phase transformation produces a thermally insulating air pocket therebetween.

A number of fiber-reinforced resin layers are disposed over the energy absorbing layers. The fiber-reinforced layers can be made from the same or different fiber and resin components used to form the structural wall.

The fire resistant layer in the first embodiment, and energy absorbing material layers in the second embodiment, are each formed having a sufficient wall thickness to protect the structural wall of the pipe or pipe fitting from heat induced degradation caused by exposing the outermost pipe wall to a 1,000° C. flame for at least five minutes when the pipe is in a dry condition, i.e., when the pipe is not charged with water.

Fire resistant pipes and pipe fittings prepared according to principles of this invention are lightweight, weatherable, corrosion resistant, chemical resistant, and have sufficient temperature resistance to be used in fire fighting pipe applications without suffering temperature or flame contact related failure. Fire resistant pipes of this invention, when exposed to flame contact, do not produce toxic smoke and have enhanced impact resistance and flexibility when compared to conventional fiber reinforced plastic pipes formed from epoxy and polyester resin ingredients.

DESCRIPTION OF THE DRAWINGS

These and other features and advantages of the present invention will become appreciated as the same becomes better understood with reference to the specification, claims, and drawings wherein:

DETAILED DESCRIPTION

Figure 1:
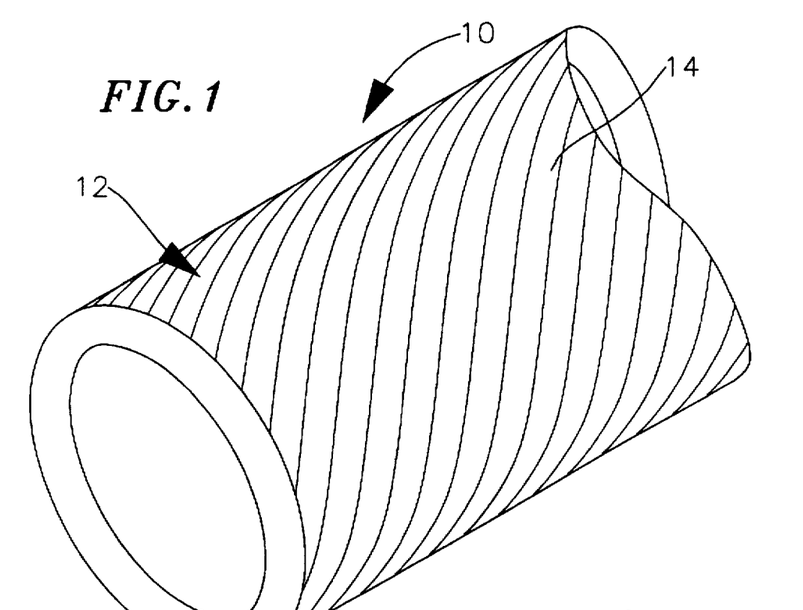
FIG. 1 is a side elevational view of a first fire resistant pipe embodiment constructed according to principles of this invention prior to application of one or more fire resistant layer(s)

Referring to FIG. 1, a fire resistant pipe 10 constructed according to principles of this invention includes a structural pipe wall 12 formed from multiple layers of helically wound reinforcing fiber 14 bonded together with a resin 16. The structural pipe wall 12 can be formed by using conventional techniques well known in the art for forming fiber-reinforced plastic (FRP) pipe, such as by winding the reinforcing fiber around a mandrel at one or more specific wind angles, and in one or more directions, to obtain a particular degree of hoop and longitudinal strength. In a preferred embodiment, the fiber windings are wound under tension at an angle of approximately 54 degrees around the mandrel in one directions and then in an opposite direction, as this wind angle is known to produce a pipe having an optimum degree of both hoop and longitudinal strength. The number of fiber windings that are used to construct the structural pipe wall depends on the particular size of and application for the pipe. While the above-described technique has been directed toward the construction of pipe, it is to be understood that the same technique can be used to construct pipe fittings such as tees, elbows and the like as well.

The reinforcing fiber component may be selected from conventional filament materials used for forming FRP pipe that do not melt when exposed to fire such as glass, carbon, and the like, and combinations thereof. In a preferred embodiment, the reinforcing fiber is glass. The structural pipe wall is constructed so that a sufficient amount of the resin component is used to wet and bond together the fiber windings. The structural pipe wall may comprise in the range of from about 10 to 40 percent by weight of the resin component. In a preferred embodiment, the structural pipe wall comprises approximately 25 percent by weight resin. The resin is applied to the fiber windings by a conventional application technique, such as by running the windings through a resin bath.

The resin component may be selected from the group of resins consisting of phenolic resins, siloxane-modified phenolic resins, furan resins, and mixtures thereof. Any type of phenolic resin can be used as the resin component and is ultimately selected based on the desired physical properties for the intended end use application. Preferred phenolic resins suitable for use in forming the structural pipe wall include phenolic resole and phenolic novolac resins. Suitable phenolic resins can include those based on phenol, substituted phenols like para-cresol, xylenol, bisphenol A, paraphenylphenol, para-tert-butyl phenol, para-t-octyl phenol and resorcinol. The phenolic resin can be prepared by combining a suitable phenol with an aldehyde, such as formaldehyde, acetaldehyde, paraldehyde, glyoxal, hexamethylene-tetraamine, and furfural.

Preferred phenolic resins are low viscosity phenolic resole resins because of their optimal wetting of the fiber-reinforcing material and their contribution to producing a fiber-reinforced pipe having a high glass content. Preferred phenolic novolacs found most useful in this invention are prepared from any of the phenols and aldehydes previously described and have molecular weights in the range of from about 400 to 5,000 with glass transition temperatures in the range of from about 40° C. to 90° C. Phenolic resoles found most useful in this invention have molecular weights in the range of from about 300 to 3,000, solids contents from 50 to

90% by weight, and may contain from 2 to 20% by weight free phenol or substituted phenol and from 1 to 10% by weight water.

Manufacturers of suitable phenolic resins include: B.P. Chemical Division of British Petroleum of Barry U.K.; the Packaging and Industrial Products Division of Borden, Inc., of Columbus, Ohio; the Durez Division of Occidental Petroleum of Dallas, Tex.; Georgia-Pacific Corporation of Atlanta, Ga.; Neste Resins Corporation of Eugene, Oreg., as well as a number of other small producers. Some preferred phenolic resins include B.P. Chemical's Cellobond J1996L, J2018L and J2027L, Borden's SL-898 phenolic resole, and Georgia-Pacific's GP5018 phenolic resole.

Particularly preferred siloxane-modified phenolic resins useful in forming the structural pipe wall include those prepared by combining, in a first embodiment, a silicone intermediate, a phenol or substituted phenol, and an aldehyde donor, by combining, in a second embodiment, one of the above-described phenolic novolac resins with a silicone intermediate, or by combining, in a third embodiment one of the above-described phenolic resole resins with a silicone intermediate.

In a first embodiment, a siloxane-modified phenolic resin is prepared by combining phenol or a substituted phenol described above, with an aldehyde described above, and a silicone intermediate. The amount of aldehyde present and the type of catalyst used will determine whether a siloxane-modified phenolic novolac or resole resin is formed.

With respect to the silicone intermediate, alkoxy-functional and silanol-functional silicone intermediates may be used. Silicone intermediates as referred to in this invention are chemical polymer structures that have an —Si—O— backbone and that are capable of undergoing further reaction, e.g., hydrolysis and/or condensation, to form a cured polymer structure. A preferred class of silicone intermediates have the formula where each $R_2$ is independently selected from the group consisting of the hydroxy group, alkyl, aryl, aryloxy, and alkoxy groups having up to six carbon atoms, where each $R_1$, is independently selected from the group consisting of hydrogen, alkyl, and aryl groups having up to 12 carbon atoms, and where n is an integer in the range of from 1 to 56, selected so that the average molecular weight of the silicone intermediate is from about 150 to about 10,000. It is believed that the molecular weight of the silicone intermediate selected may have an impact on the degree to which an interpenetrating network (IPN) of phenolic polymer and siloxane polymer is formed, and the proportion of siloxane groups that copolymerize with the phenolic polymer to form a continuous phase.

Another group of silicone intermediate can be represented by an hydroxyl (OH) containing silicone material, including those materials wherein the OH group or groups are attached directly to the silicon atom such as the silanol materials having the general formulas and and where each $R_5$ group may comprise a hydrocarbon radical selected from the group including alkyl, alkenyl, cycloalkyl, aryl, alkaryl, or aralkyl radicals, and where $n_1$, may be an integer in the range of from about one to thirty.

Still another group of OH containing silicone materials are materials that comprise two or more OH groups attached to a silicon atom, and that have two or more silicon atoms attached through divalent organic radicals, such as those having the general formula where each $R_6$ group may comprise another OH group or may comprise a hydrocarbon radical selected from the group including alkyl, cycloalkyl, aryl, alkaryl, and alkylaryl radicals, where $R_7$ may comprise a divalent organic radical selected from the group including methylene, polymethylene, aralyene, polyaralyne, cycloalkylene, and polycycloalkylene.

Methoxy-functional silicone intermediates useful in this invention include, but are not limited to: DC-3074, DC-3037 from Dow Corning Corporation of Midland, Mich.; SY-231 (molecular weight approximately 1,000) and MSE-100 from Wacker Silicone Corporation; and SR-191 from General Electric. Silanol-functional silicone intermediates generally have in the range of from about 0.5% to 6% by weight Si—OH. Commercially available silanol-functional silicone intermediates useful in this invention include, but are not limited to: Diphenylsilandiol (molecular weight approximately 216), Wacker Silicones SY-409 (molecular weight approximately 10,000) and SY-430; and the following materials from Dow Corning: DC804, DC805, DC806A, DC840, Z-6018, DC-1-2530, DC-6-2230, DC-1-0409, DC-1-0410 and laminating resins 2103, 2104 and 2106.

A preferred first embodiment of a siloxane-modified phenolic resin is prepared by combining phenol, or substituted phenol, an aldehyde such as formaldehyde, and a silicone intermediate. On the basis of a charge weight of one mole of phenol, the weight of formaldehyde will vary between 0.75 and 0.90 moles, and the weight of silicone intermediate will vary between 0.01 and 0.3 moles. The molar ratio of phenol to formaldehyde in a phenolic novolac resin is typically 1:0.75–0.90. Table 1 shows the typical molar ranges of silicone intermediates, having different molecular weights, used to prepare the siloxane-modified phenolic novolac resin.

TABLE 1

| SILICONE INTERMEDIATE | MOLECULAR WEIGHT | 1 MOLE PHENOL AND 0.75 MOLE FORMALDEHYDE | 1 MOLE PHENOL AND 0.90 MOLE FORMALDEHYDE |
|---|---|---|---|
| Diphenylsilandiol | 216 | 0.01–0.3 mole silicone intermediate | 0.01–0.3 mole silicone intermediate |
| SY-231 | 1,000 | 0.01–0.2 mole silicone intermediate | 0.01–0.2 mole silicone intermediate |
| SY-409 | 10,000 | 0.01–0.05 mole silicone intermediate | 0.01–0.05 mole silicone intermediate |

A first preferred embodiment of a siloxane-modified phenolic resole resin is prepared by combining phenol, or substituted phenol, an aldehyde such as formaldehyde, and a silicone intermediate. On the basis of a charge weight of one mole of phenol, the weight of formaldehyde will vary between 1.2 and 3 moles, and the weight of silicone intermediate will vary between 0.01 and 0.7 moles. The molar ratio of phenol to formaldehyde in a phenolic resole resin is typically 1:1.2–3. Table 2 shows the typical ranges of silicone intermediates having different molecular weights used to prepare the siloxane-modified phenolic resole resin.

TABLE 2

| SILICONE INTERMEDIATE | MOLECULAR WEIGHT | 1 MOLE PHENOL 1.2 MOLE FORMALDEHYDE | 1 MOLE PHENOL 3 MOLE FORMALDEHYDE |
|---|---|---|---|
| Diphenylsilandiol | 216 | 0.01–0.7 mole silicone intermediate | 0.01–0.3 mole silicone intermediate |
| SY-231 | 1,000 | 0.01–0.02 mole silicone intermediate | 0.01–0.02 mole silicone intermediate |
| SY-409 | 10,000 | 0.01–0.05 mole silicone intermediate | 0.01–0.05 mole silicone intermediate |

For each of the above-described first embodiments of the siloxane-modified phenolic novolac and resole resins, it is desired that in the range of from about 0.5 to 35 percent by weight of the silicone intermediate be used.

In preparing first embodiments of the siloxane-modified phenolic resins, catalysts are used to form either a desired phenolic novolac or phenolic resole resin prepolymer. For example, when forming the siloxane-modified phenolic resin, a strong acid such as sulfuric acid, sulfonic acid, oxalic acid, or phosphoric acid is used to facilitate formation of the phenolic novolac resin prepolymer. When forming the siloxane-modified phenolic resin, a strong base such as sodium hydroxide, calcium hydroxide or barium hydroxide is used to facilitate formation of the phenolic resole prepolymer. In preferred first embodiments, a siloxane-modified phenolic novolac resin may be prepared by using up to about five percent by weight acid catalyst, and a siloxane-modified phenolic resole resin may be prepared by using up about five percent by weight base catalyst.

Catalysts other than, and in addition to, those described above can optionally be used in preparing first embodiments of the siloxane-modified phenolic resin to facilitate condensation of the phenolic resin and silicone intermediate by reducing the time and/or temperature associated with such reactions. Catalysts useful for facilitating condensation of the phenolic resin and silicone intermediate are the same, and can be used in the same proportion, as those described below that can optionally be used for preparing second and third embodiments of the siloxane-modified phenolic resin.

First embodiments of the siloxane-modified phenolic novolac and resole resins are prepared by first combining the phenol and silicone intermediate ingredients and then adding the aldehyde ingredient to form a mixture of phenolic polymers, siloxane polymers, and phenolic-siloxane polymers. Elevating the temperature of the combined mixture is desirable to reduce reaction times associated with forming the siloxane-modified phenolic resin.

For example, a first embodiment of the siloxane-modified phenolic novolac resin can be prepared by a batch process using a jacketed stainless-steel reaction vessel equipped with a turbine blade or anchor-type agitator, a vapor condenser, and a temperature controller. Typically, molten phenol is charged to the reaction vessel, the agitator is started and silicone intermediate is added. An acid catalyst can be added at this point to facilitate formation of the phenolic novolac polymer. Formalin (37–40 percent aqueous formaldehyde) is then charged to the reaction vessel, either before raising the temperature, or by controlled addition at elevated temperature. A vigorous condensation reaction ensues which is highly exothermic. The condensation step is continued until the desired molecular weight distribution has been achieved. During this time the mixture may become two phases with separation of the resinous component. The actual reaction time will vary depending on the desired molecular weight distribution, the use of one or more catalysts, pH, and aldehyde to phenol to silicone intermediate mole ratios.

The ingredients are mixed together, during which time the phenol, aldehyde and silicone intermediate undergo polycondensation, which polycondensation can optionally be accelerated by action of a catalyst, as described below. During this time, alkoxy-functional silicone intermediates also undergo hydrolysis to form silanol-functional silicone intermediates, which polymerize to form a siloxane polymer and also copolymerize with the newly-formed phenolic novolac resin prepolymer to form a siloxane-modified phenolic resin. Accordingly, the resulting resin comprises an IPN of phenolic novolac polymer and siloxane polymer, and a continuous phase formed from the phenolic polymer having one or more siloxane groups in its backbone. Hydrolysis of the alkoxy-functional silicone intermediates can optionally be accelerated by action of a catalyst, as described below. Alternatively, silanol-functional silicone intermediates can be used in the process which can copolymerize directly with newly-formed phenolic novolac resin prepolymer.

At the end of the condensation period, water, residual moisture, unreacted phenol and low molecular weight species may be removed by atmospheric, vacuum or steam distillation. The point at which distillation is stopped is usually determined by taking a sample of the resin and measuring its melt viscosity. After the resin has cooled, it can be treated in several ways. It can be sold in lump or flake form, compounded to form molding powders, or it can be ground and blended with hexamine and other fillers.

As another example, a first embodiment of the siloxane-modified phenolic resole resin can be prepared by a batch process using the same equipment previously described for preparing a first embodiment of the siloxane-modified phenolic novolac resin. Typically, molten phenol is charged to the reaction vessel, the agitator is started and silicone intermediate is added. Alkaline catalysts may be added at this time to facilitate formation of the phenolic resole polymer. Formalin is added and the batch is heated. The initial reaction is exothermic. Condensation is usually carried out at atmospheric pressure and at temperatures in the range of from 60° to 100° C. or at reflux. Because siloxane-modified phenolic resole siloxane resins are themselves thermosetting, dehydration is carried out quickly and at low temperatures so as to prevent over-reaction or gelation. The end point is found by manual determination of a specific hot-plate gel time, which decreases as resinification advances. Siloxane-modified phenolic resole resins can be refrigerated to prolong their storage stability.

Second and third embodiments of a siloxane-modified phenolic novolac resin and a siloxane-modified phenolic resole resin, respectively, are prepared by using a phenolic novolac resin and phenolic resole resin, respectively, as starting materials. Suitable phenolic resole and phenolic novolac resins include those previously described above. The second embodiment of the siloxane-modified phenolic novolac resin is prepared by combining in the range of from 75 to 95 percent by weight of the phenolic novolac resin. The third embodiment of the siloxane-modified phenolic resole resin is prepared by combining in the range of from 65 to 99.5 percent by weight of the phenolic resole resin.

With respect to the silicone intermediate, those silicone intermediates previously described for preparing the first embodiments of the siloxane-modified phenolic resin are also used to prepare the second and third embodiments of the siloxane-modified phenolic resins. Second and third embodiments of the siloxane-modified phenolic resins may each comprise in the range of from 0.5 to 35 percent by weight of the alkoxy-functional or silanol-functional silicone intermediate.

In the second embodiment, the siloxane-modified phenolic novolac resin is prepared by combining a phenolic novolac resin with a formaldehyde donor and a silicone intermediate. Suitable formaldehyde donors include aqueous formaldehyde solutions, paraform, trioxane, hexamethylenetetraamine and the like, a preferred material is hexamethylenetetraamine. The second embodiment of the siloxane-modified phenolic novolac resin may comprise in the range of from about 3 to 15 percent by weight of the formaldehyde donor.

The third embodiment of a siloxane-modified phenolic resole resin is prepared by combining a phenolic resole resin with a silicone intermediate. If desired, either an acid or base catalyst can optionally be used to reduce reaction time associated with finally curing the resin. Suitable inorganic acid catalysts that can optionally be used in the third embodiment include phosphoric, hydrochloric, and sulfuric acids. Suitable organic acids that can optionally be used in the third embodiment include paratoluene sulfonic and phenyl sulfonic acids. Latent acid catalysts can also be used in to improve pot life and to increase the application window without gel formation. Suitable base catalysts for curing phenolic resoles include various forms of barium and magnesium oxide, and the like. Commercially available proprietary latent acid type catalysts useful in this invention are available from British Petroleum Chemicals under the trade name Phencat 381 and Phencat 382. Other proprietary catalysts include Borden RC-901, a diphenyl phosphoric acid ester supplied from Dover Corp., having the product name Doverphos 231L, and Georgia-Pacific's GP3839 and GP308D50. The third embodiment of the siloxane-modified phenolic resole resin may comprise up to about 15 percent by weight of the optional acid or base catalyst or curing agent.

If desired, the first, second and third embodiments of the siloxane-modified phenolic resins may each optionally comprise a sufficient amount of catalyst to reduce the reaction time and reduce the reaction temperatures associated with condensing the silicone intermediate and copolymerizing it with the phenolic polymer during formation of the siloxane-modified phenolic resin.

Suitable catalysts are selected from the group consisting of organometallic compounds, amine compounds, and mixtures thereof. Combinations of an organometallic compound with an amine compound are preferred, when desired, for catalyzing hydrolysis and/or condensation of the silicone intermediate. Useful organometallic compounds include metal driers well known in the paint industry such as zinc, manganese, cobalt, iron, lead and tin octoate, neodecanates and naphthenates, and the like. organotitanates such as butyl titanate and the like are also useful in the current invention.

A preferred class of organometallic compounds useful as a catalyst is organotin compounds which have the general formula where $R_8$, $R_9$, $R_{10}$ and $R_{11}$, are selected from the group consisting of alkyl, aryl, aryloxy, and alkoxy groups having up to 11 carbon atoms, and where any two of $R_8$, $R_9$, $R_{10}$ and $R_{11}$, are additionally selected from a group consisting of inorganic atoms consisting of halogen, sulfur and oxygen.

Organotin compounds useful as catalysts include tetramethyltin, tetrabutyltin, tetraoctyltin, tributyltin chloride, tributyltin methacrylate, dibutyltin dichloride, dibutyltin oxide, dibutyltin sulfide, dibutyltin acetate, dibutyltin dilaurate, dibutyltin maleate polymer, dibutyltin dilaurylmercaptide, tin octoate, dibutyltin bis (isooctylthioglycolate), butyltin trichloride, butylstannoic acid, dioctyltin dichloride, dioctyltin oxide, dioctyltin dilaurate, dioctyltin oxide, dioctyltin dilaurate, dioctyltin maleate polymer, dioctyltin bis (isooctylthioglycolate), dioctyltin sulfide, and dibutyltin 3-mercapto propionate. The first, second and third embodiments of the siloxane-modified phenolic resin may comprise up to about five percent by weight of the organometallic catalyst.

With respect to the amine compound, preferred amine compounds for optionally catalyzing the hydrolysis and/or condensation reactions of the silicone intermediate have the general formula where $R_{12}$ and $R_{13}$ are each selected from the group consisting of hydrogen, aryl, and alkyl groups having up to 12 carbon atoms, and where $R_{14}$ is selected from the group consisting of alkyl, aryl, and hydroxyalkyl groups having up to 12 carbon atoms.

Suitable amine compounds useful as catalysts include dimethyl methanolamine, ethylamino ethanol, dimethyl ethanolamine, dimethyl propanolamine, dimethyl butanolamine, dimethyl pentanolamine, dimethyl hexanolamine, methylethyl methanolamine, methylpropyl methanolamine, methylethyl ethanolamine, methylethyl propanolamine, monoisopropanolamine, methyldiethanolamine, triethanolamine, diethanolamine, and ethanolamine. Preferred amine compounds include dimethyl ethanolamine and ethyl aminoethanol. The first, second and third embodiments of the siloxane-modified phenolic resin may comprise up to about five percent by weight of the amine catalyst.

If desired, the organometallic compound and amine compound can each be used independently to form a siloxane-modified phenolic resin. However, it has been discovered that when combined, the organometallic compound and amine compound act synergistically to catalyze the curing process, thereby reducing the curing time further and/or reaction temperatures greater than that observed by using either the organometallic or amine catalyst alone. Accordingly, if desired under the circumstances, it is preferred that an organometallic compound be used in combination with an amine compound to catalyze both the formation of hydroxide by hydrolysis of the silicone intermediate, in the event that an alkoxy-functional silicone intermediate is used, and polymerization by condensation of both the alkoxy and silanol-functional silicone intermediate. An exemplary organometallic and amine compound combination is dibutyltin diacetate and ethyl aminoethanol. Dibutyltin diacetate, when combined with the amine, reacts synergistically to catalyze the curing process. Although it is believed that the synergistic effect of the organotin compound and the amine compound is mechanistic in character, the exact mechanism is not known.

A preferred ratio of organometallic compound to amine compound, when used together as the catalyst, is approximately one to one. Therefore, the first, second and third siloxane-modified phenolic resins may comprise up to about 10 percent by weight combined organometallic and amine catalyst. Accordingly, siloxane-modified phenolic resins prepared by combining an organometallic and amine catalyst, and an optional acid or base catalyst may comprise up to about 25 percent by weight catalyst. Preferred first, second and third siloxane-modified phenolic resins comprise in the range of from 5 to 25 percent by weight of the combined catalysts.

Water may be present in the form of an aqueous phenolic resole or in the form of an aqueous formaldehyde. For example, the phenolic resole may comprise in the range of from 3 to 12 percent by weight water, and the formaldehyde may comprise formalin, which is approximately 37–40 percent aqueous formaldehyde. The first, second and third embodiments of the siloxane-modified phenolic resin can result in the formation of phenolic resins having very low or zero water content, which provides improved fire stability and processing characteristics. The silicone intermediate functions as a reactive diluent to give a stable product with generally low viscosity.

Second and third embodiments of the siloxane-modified phenolic resin are prepared by combining in the above-described proportions a phenolic novolac or resole resin with a methoxy or silanol-functional silicone intermediate. A formaldehyde donor is added in the second embodiment. If desired, the catalyst for the phenolic resin, and the catalyst for the silicone intermediate, i.e., the organometallic compound and/or the amine compound, can optionally be added to reduce reaction and cure time and reduce reaction temperature.

Fire resistant pipes having the structural pipe wall and fire resistant layer formed from siloxane-modified phenolic resins display improved physical properties of hoop strength, chemical resistance, flexibility, impact resistance, and flexural modulus when compared to pipes otherwise formed from non-modified phenolic resins, without affecting the physical properties of heat, flame and chemical resistance inherent in the phenolic resin. Additionally, fire resistant pipes formed from such siloxane-modified phenolic resins have reduced microvoid formation and, therefore, densities closer to theoretical density when compared to conventional non-modified phenolic resins. Less microvoid formation also prevents possible water entrapment that would adversely affect the resin's temperature resistant properties due to steam generation and related resin matrix failure.

Furan resins can be selected for use in forming the structural pipe wall because of their enhanced temperature resistance when compared with conventional epoxy and polyester FRP resins. Furan resins, however, display a lower degree of temperature resistance and are more expensive than either the phenolic or siloxane-modif ied phenolic resins.

The structural pipe wall of the fire resistant pipe is constructed having one or more layers of fiber windings. For example, for an approximately two inch inside diameter pipe, rated at 225 psig for fire fighting pipe service, it is desired that the structural wall comprise in the range of from 2 to 20 layers of fiber winding, and optimally 6 to 16 layers of fiber winding. A structural pipe wall having less than about 2 layers of fiber winding will have a degree of hoop and longitudinal strength, and temperature resistance less than that desired for use in a fire fighting pipe application. A structural pipe wall constructed having more than about 20 layers of fiber winding is more than that necessary to provide a sufficient degree of hoop and longitudinal strength, and temperature resistance for use in a fire fighting pipe application and, therefore adds unnecessary weight and expense to the pipe.

Figure 2:
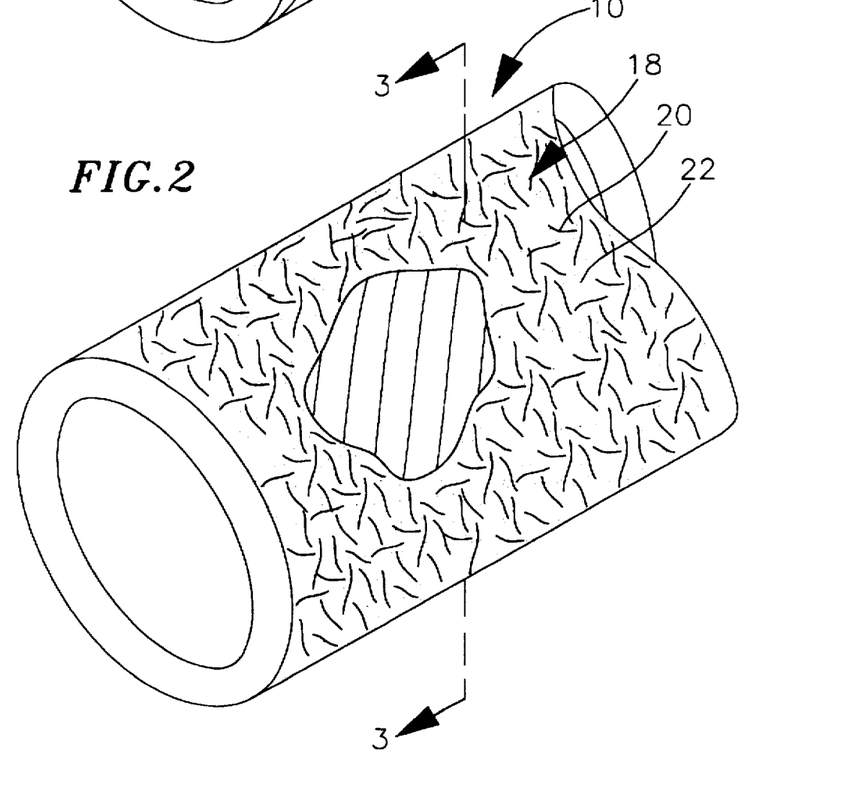
FIG. 2 is a side elevational view of the fire resistant pipe of FIG. 1 after application of one or more fire resistant layer(s)

Referring now to FIG. 2, in a first embodiment, a fire resistant layer 18 is disposed around the outside surface of the structural pipe wall 12. The fire resistant layer 18 is generally a resin rich heat-ablative shield that is used to surround the structural pipe wall 12 and protect it from exposure to high temperature or direct flame contact. The fire resistant layer 18 comprises a carrier component 20 that is impregnated with a resin component 22. Typically, fire resistant layer 18 is wound circumferentially around the outside surface of the structural pipe wall 12 until a desired number of layers, i.e., heat shield wall thickness, is obtained. The fire resistant layer can, however, be applied by a spray application technique.

Figure 3:
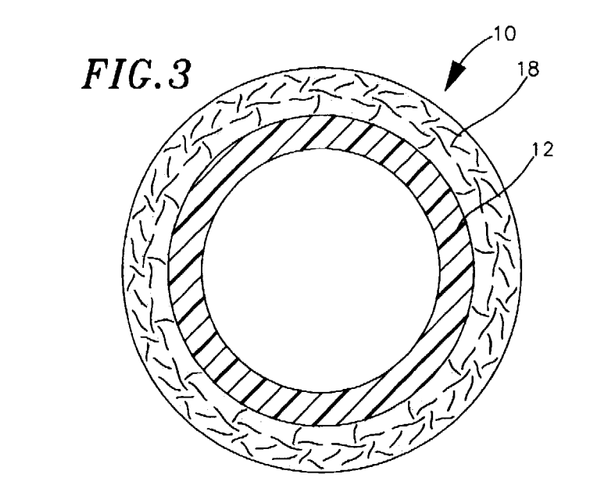
FIG. 3 is a cross sectional view of the fire resistant pipe of FIG. 2 taken across section 3—3.

FIG. 3 illustrates a first embodiment of a fire resistant pipe 10 constructed according to principles of this invention comprising a structural wall 12 formed from multiple fiber windings 14, and multiple fire resistant layers 18. The number of fire resistant layers that are used to form the fire resistant pipe or pipe fitting varies, depending such factors as the size of the pipe, the potential temperature or flame exposure by the pipe, the type of fiber and/or resin component selected to form the structural pipe wall, the type of carrier and/or resin component selected to form the fire resistant layer, and the like. Preferred embodiments of the first fire resistant pipe embodiment may include in the range of from 1 to 15 fire resistant layers, depending on the above-mentioned factors. In one example, for an approximately two inch inside diameter pipe, the fire resistant pipe comprises in the range of from 2 to 15 fire resistant layers.

The fire resistant layer 18 can be wound around the structural pipe wall 12 by conventional winding techniques, such as those described above for constructing the structural pipe wall. It is desired that the fire resistant layer be wound at a sufficient tension to provide a good interface between the adjoining pipe wall and fire resistant layer surfaces. In a preferred first embodiment, the fire resistant layer 18 is applied shortly after forming the structural pipe wall, and before the resin component of the pipe wall has cured, to provide good interlayer bonding during cure between the interfacing resin components of the pipe wall and fire resistant layer. Accordingly, as described below, it is desired that the resin component of the fire resistant layer be compatible with the resin used to form the structural pipe wall.

The carrier component 20 used to form the fire resistant layer 18 can be formed from any type of material capable of both accommodating a large amount of the resin component and providing a support structure for the resin in both a wet and cured state. Additionally, it is desired that the carrier be capable of supporting the resin and not crumbling or flaking away from the structural pipe wall when subjected to high temperature or direct flame. It is desired that the carrier be capable of accommodating in the range of from 75 to 95 percent by weight of the resin component, or roughly three times the resin content of the fiber-reinforced windings. In a preferred first embodiment, the fire resistant layer comprises approximately 90 percent by weight resin.

Suitable carrier materials include fibrous mat-like structures comprising glass fiber, carbon fiber, mixtures of polyester fiber or nylon fibers with other high-temperature fibers, similar fiber felts, chopped fibers, and the like, and combinations thereof. A preferred glass fiber containing carrier material is one manufactured by Owens Corning of Toledo, Ohio under the product name C-Veil, product code number GC 70E, which is a thin mat of randomly oriented chopped C-glass fibers that are bound together by a binder dispersion. A preferred polyester fiber containing material is one manufactured by Precision Fabrics Group of Greensboro, N.C. under the product name Nexus, product code number 111-00005, which is formed from stretched and heat set 100 Dacron® polyester, and that does not contain any glass fibers.

Although the carrier component has been described and illustrated as being a mat-like structure applied by conventional winding technique, it is to be understood that the carrier can alternatively be in the form of a spray applicable material containing chopped fibers and resin. Suitable spray applicable carriers include those capable of being loaded with the above-described amount of the resin component for spray application onto the surface of the structural pipe wall using conventional spray application techniques.

The carrier component provides a fibrous reinforcement in the resin matrix of the fire resistant layer. The fibers provide mechanical strength for the resin which may be somewhat brittle. Thermal decomposition of the resin makes it brittle even when relatively impact resistant before exposure. The effect is that the fire resistant layer at most ablates in fine particles instead of spalling in large flakes that would rapidly deplete the resin rich protective layer and expose the underlying structural wall of the pipe to thermal degradation. Surprisingly, some thermoplastic resin fibers may be used even though they would seem to be subject to significant degradation in a flame test. Such fibers work best, however, when mixed with high-temperature fibers. Glass fibers are, however, preferred for strength and temperature resistance.

The resin component 22 used to impregnate the carrier component to form the fire resistant layer 18 is selected from the same group of phenolic resins, siloxane-modified phenolic resins, furan resins, and mixtures thereof described above for the resin used to form the structural pipe wall. The resin component is applied to the carrier, when embodied as a mat-like structure, by the same technique described above for applying resin to the fiber-reinforced windings. It is preferred that the resin component selected for the fire resistant layer be the same as that selected to form the underlying structural pipe wall to ensure chemical compatibility and, thereby provide a good chemical bond between interfacing structural pipe wall and fire resistant layer surfaces during cure. Furthermore, by using the same resin, a single cure cycle is used for the entire pipe. The first fire resistant pipe embodiment may be constructed having one or more layer(s) of the same type of fire resistant material, or may be constructed having one or more layers of different types of the fire resistant material. It is desired that the resin component of each different type of fire resistant material be compatible with the resin component of the adjacent structural pipe wall or fire resistant layer surface to promote good interlayer bonding. For example, the fire resistant pipe or pipe fitting may include, moving outwardly from the surface of the pipe wall, one or more layer(s) of the C-Veil-type material, one or more layer(s) of the Nexus type material, and one or more layer(s) of the C-Veil type material, each impregnated with the same resin component as that used to form the structural pipe wall. The use of different types of fire resistant layers may be desired to reduce raw material costs, optimize temperature resistance, minimize weight, or the like. In a preferred first fire resistant pipe embodiment, the fire resistant layer is formed from alternating layers of C-glass fiber (C-Veil) and polyester material (Nexus) impregnated with a siloxane-modified phenolic resin composition.

After the structural pipe wall has been formed, and the fiber resistant layer has been applied, the resin components of the first fire resistant pipe embodiment are cured simultaneously by exposing the pipe to a temperature in the range of from about 140° to 190° F. (60° to 88° C.) for a period of about 30 minutes. It is desired that the resins used to form the structural pipe wall and the fire resistant pipe comprise sufficient catalyst to effect cure at a temperature below about 212° F. (100° C.). It is to be understood that the cure conditions for the pipe may vary depending on the amount and/or type of catalyst used, the type of resin selected, the number of fiber-reinforced windings, the number of fire resistant layers, and the like.

The cured fire resistant layer acts as a heat ablative coating that forms a porous outer layer when exposed to conditions of high-temperature or direct flame. The porous outer layer does ablate away from the pipe but, remains intact to form a heat insulating layer that protects the underlying structural pipe wall from potentially damaging effects of such high-temperature or direct flame conditions.

Figure 4:
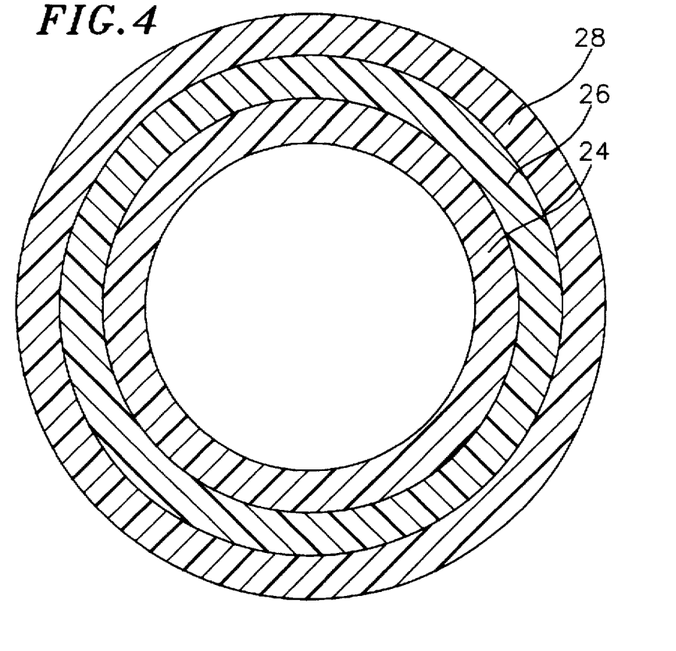
FIG. 4 is a cross sectional view of a second fire resistant pipe embodiment comprising an energy absorbing material layer interposed between a structural pipe wall and an outside fiber-reinforced resin layer.

Referring now to FIG. 4, a second fire resistant pipe embodiment constructed according to principles of this invention includes a structural wall 24, constructed as described above for the first fire resistant pipe embodiment, and one or more layers of an energy absorbing material 26 disposed onto the surface of the structural pipe wall. The energy absorbing material used to form the layer is preferably one capable of absorbing a large degree of heat from an outside surrounding layer and using such energy, e.g., via an endothermic reaction, to effect a phase change, e.g., from solid to gas, below the degradation temperature of the structural wall. The gas formed from the layers produce a thermally insulating air gap between the outside surrounding layer and the structural pipe wall.

Suitable energy absorbing materials include polymeric materials, solid hydrate or hydrite materials and the like that are capable of undergoing an endothermic phase transformation to vaporize, or liberate a gas, at a temperature below the degradation temperature of the resin selected to form the underlying structural wall, i.e., below about 300° C.

Examples of preferred energy absorbing materials include polyethylene, hydrated calcium sulfate (gypsum), aluminum trihydroxide, and other hydrated or hydroxide containing compounds capable of vaporizing or producing a gas constituent below about 300° C. Polymeric materials, such as polyethylene and the like, filled with a powder component are also desired, as the combination of gas and powder produced during vaporization produces a gas and powder layer between the outside surrounding layer and the structural pipe wall having enhanced thermal insulating properties.

When polyethylene is used as the energy absorbing material to form a second fire resistant pipe embodiment, it can be wound in sheet form around the structural pipe wall 24 a number of times to form a desired number of layers or layer thickness. When polyethylene in the form of 0.15 millimeter thick sheet is used, it is desired that in the range of from 4 to 20 layers be used, thereby providing a total energy absorbing material wall thickness in the range of from about 0.6 to 3 millimeters. The polyethylene sheet is applied by the same winding technique described above for the structural pipe wall and fire resistant layer of the first fire resistant pipe embodiment. It is not necessary that the polyethylene layer be applied at a specific wind angle, since it is intended to be sacrificial and not contribute to the hoop or longitudinal strength of the pipe. Where the energy absorbing material is other than polyethylene, it can be applied in sheet form, in spray form, or in the form of solid half sheets configured to fit over part of the structural pipe wall.

Layers of fiber-reinforced resin 28 are wound around an outside surface of the energy absorbing material layer 26. The fiber-reinforced resin can be the same as that selected to form the structural pipe wall 24, or can be different. In a preferred second fire resistant pipe embodiment, the fiber-reinforced resin is the same, and is applied in the same manner, as that selected to form the structural pipe wall. The number of layers of the fiber-reinforced resin that is applied depends on the particular pipe application and the degree of heat or flame resistance desired. Preferred second fire resistant pipe embodiments may include in the range of from 2 to 20 layers of the fiber-reinforced resin 28.

Alternatively, a second fire resistant pipe embodiment may comprise a number of repeating fiber-reinforced resin layers and energy absorbing material layers. For example, a fire resistant pipe can include first energy absorbing material layers disposed onto the structural pipe wall, first fiber-reinforced resin layers disposed onto an outside surface of the first energy absorbing material layers, second energy absorbing layers disposed onto a surface of the first fiber-reinforced resin layers, and second fiber-reinforced resin layers disposed onto an outside surface of the second energy absorbing material layers. In such an embodiment, the energy absorbing materials selected to form the first and second energy absorbing material layers can be the same or can be different, and can be selected so that an energy absorbing material having a relatively higher vaporization temperature below the degradation temperature of the fiber-reinforced resin layers is used to form the outermost energy absorbing material layer. In such an embodiment, the number of each energy absorbing material layers can be the same as or less than that disclosed above for an embodiment having a single energy absorbing material layer.

Figure 5:
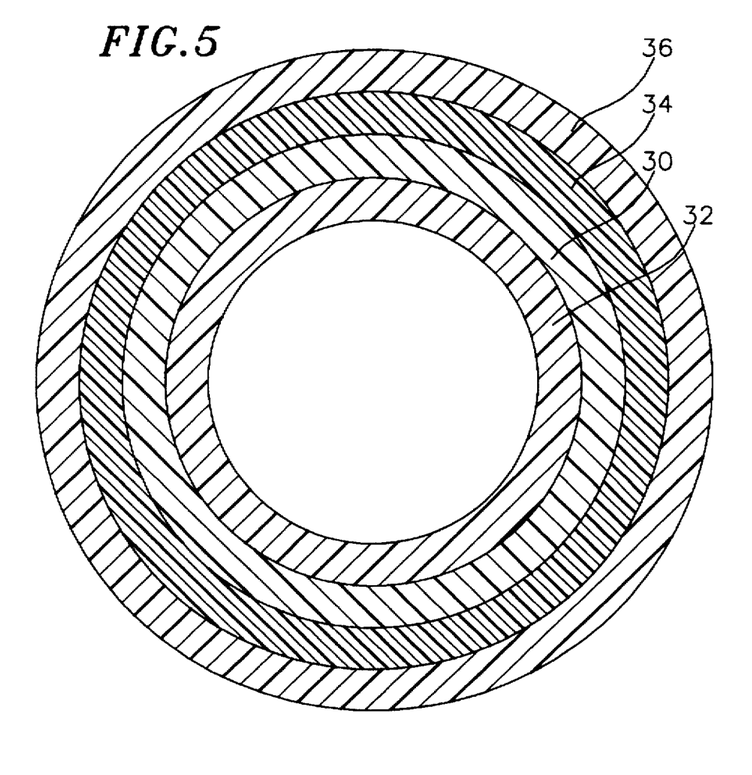
FIG. 5 is a cross sectional view of an alternative second fire resistant pipe embodiment comprising successive energy absorbing material layers interposed between a structural pipe wall and an outside fiber-reinforced resin layer.

Referring to FIG. 5, an alternative second fire resistant pipe embodiment can include two different types of energy absorbing material layers positioned adjacent one another to provide a desired degree of energy absorption and thermal insulation. For example, a number of first energy absorbing material layers 30, of a first type of energy absorbing material, are disposed onto a surface of the structural pipe wall 32. A number of second energy absorbing material layers 34, of a second type of energy absorbing material, are disposed onto a surface of the first energy absorbing material layers. Preferably, the second type of energy absorbing material has a relatively higher vaporization temperature than the first type of energy absorbing material so that the two layers act as a sequential thermal insulator to prevent harmful heat energy from reaching the structural pipe wall.

A number of fiber-reinforced resin layers 36 are wound around an outside surface of the second energy absorbing material layer. The number of fiber-reinforced resin layers 36 that are used can be the same as or less than that used to form the structural pipe wall. Additionally, the type of fiber reinforcing material and resin used to form the fiber-reinforced resin layer 36 can be the same as or different than that used to form the structural pipe wall. The number of energy absorbing material layers used to form the first and second energy absorbing material layer can be the same as or different than that used to form the single energy absorbing material layer embodiment disclosed above.

If desired, the second alternative fire resistant pipe embodiment can be formed having more than one set of energy absorbing material layers to provide a desired degree of heat and/or flame protection to the structural pipe wall. For example, the fire resistant pipe can be formed having a structural pipe wall, a first set of different energy absorbing material layers, a first fiber-reinforced resin layer, a second set of different energy absorbing material layers, and a second fiber-reinforced resin layer. In such embodiment, the types of energy absorbing materials that are used to form the first set of energy absorbing material layers can be the same as or different than that used to form the second set of energy absorbing material layers.

Alternatively, the first fire resistant pipe embodiment can be constructed having one or more layers of an energy absorbing material described above interposed between the structural pipe wall and the fire resistant layers to provide an enhanced degree of heat or flame protection to the structural pipe wall. In such an embodiment, the resin component used to form the heat shield can be different than the resin component used to form the structural pipe wall.

Additionally, if desired, the first fire resistant pipe embodiment can be constructed having one or more energy absorbing layers interposed between different types of fire resistant layers. Accordingly, it is to be understood within the scope of this invention that one or more energy absorbing material layers can be placed between the structural pipe wall and fire resistant layers and/or between different types of fire resistant layers as desired, depending on the particular application, to provide an optimum degree of heat and flame protection to the structural pipe wall.

Figure 6A:
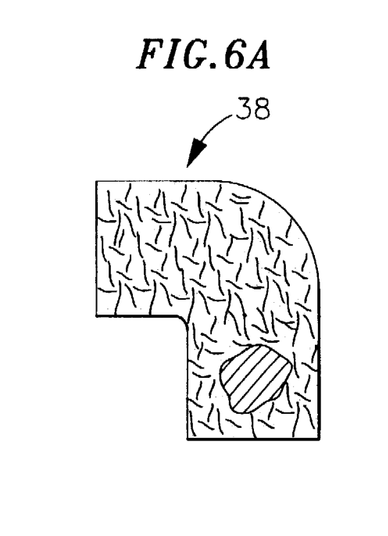
FIGS. 6A to 6C are perspective views of fire-resistant pipe fittings constructed according to principles of this invention.
Figure 6B:
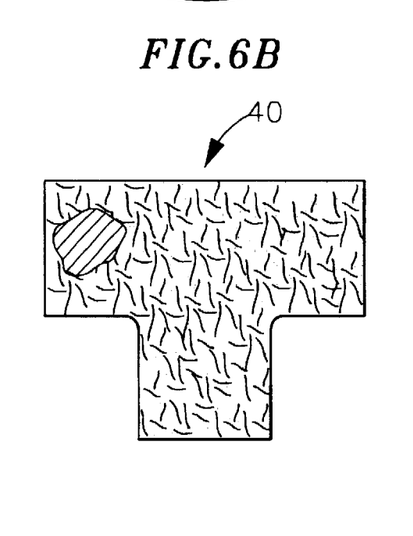
Figure 6C:
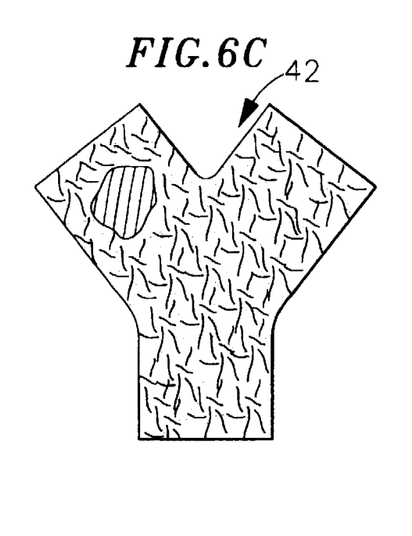

Although the construction of fire resistant pipe embodiments have been specifically described and illustrated above, it is to be understood that this invention also includes the construction of fire resistant pipe fittings. Referring to FIGS. 6A to 6C, fire resistant pipe fittings, such as elbows 38, tees 40, Y-shaped fittings 42, and the like are also prepared according to principles of this invention.

Fire resistant pipes and pipe fittings of this invention can be used alone or combined to form a pipe assembly well suited for use in fire fighting pipe applications, such as fire fighting pipe assemblies that are used on offshore platforms and the like. Pipes and pipe fittings used in such applications must be able to function under conditions of high temperature and close flame vicinity without suffering significant reductions in hoop strength and longitudinal strength.

Fire resistant pipes and pipe fittings constructed according to principles of this invention were subjected to a rigorous high-temperature to qualify for use in fire fighting piping applications. The test involved placing the pipe and/or pipe fittings approximately four inches from a 1,000° C. flame with the pipe dry, i.e., with no water contained therein, for a period of approximately five minutes. After five minutes, the pipe and/or pipe fittings were filled with water at a rated pressure of approximately 300 psig (21 Kgf/cm$^2$) for approximately fifteen minutes while still subjected to the flame. To qualify for use in a fire fighting pipe application, the pipe and/or pipe fittings must remain structurally sound when subjected to rated pressure and not show signs of leakage in excess of ten percent of the rated pipe flow. In order to determine the total pressure withstanding ability of pipes subjected to such extreme temperature conditions, and to better understand the mechanism for heat related failure, the pressure was increased on pipe and pipe fitting samples that showed no signs of pipe leakage or structural damage beyond the rated pressure until pipe failure.

The following examples illustrate different fire resistant pipe embodiments constructed according to principles of this invention, and the test results for each pipe embodiment. In each of the following examples the pipe has an inside diameter of approximately two inches.

EXAMPLE NO. 1

A fiber-reinforced pipe was constructed using twelve layers of a fiber-reinforced resin, forming a wall thickness of approximately 0.37 centimeters (cm). The structural pipe wall was formed using fiberglass reinforcing fiber windings bonded together with a siloxane-modified phenolic resin, comprising approximately 83 percent by weight BP-J2027L (phenolic resole resin), 9 percent by weight SY-231 (methoxy-functional silicone intermediate), 7 percent by weight Phencat 381 (latent acid catalyst), 0.6 percent by weight Melacure Cotlin T-1 (organotin catalyst), and 0.4 percent by weight ethyl aminoethanol (amine catalyst). This pipe did not include a fire resistant layer.

The pipe was subjected to the above-identified test and showed signs of water leakage at a rate of approximately 0.008 cubic meters per hour (m$^3$/h) at line pressure, and leaked water at a rate of approximately 0.21 m$^3$/h when pressurized to between 14 to 21 Kgf/cm$^2$. The pipe failed at a pressure of approximately 35 Kgf/cm$^2$. The mode of pipe failure was a rupture in the fiber-reinforcing component of the structural pipe wall.

EXAMPLE NO. 2

A fiber-reinforced pipe was constructed in a similar manner as that described for Example No. 1, except that the structural pipe wall thickness was approximately 0.40cm. Additionally, the pipe was constructed having two fire resistant layers disposed around the outside surface of the structural pipe wall. The fire resistant layers were formed from C-Veil impregnated with the same resin blend that was used to form the structural pipe wall. The fire resistant layers had a total wall thickness of approximately 0.21 cm.

The pipe was subjected to the above-identified test and showed slight signs of water leakage at a rate of approximately 0.0045 m$^3$/h at line pressure, and leaked water at a rate of approximately 0.025 m$^3$/h when pressurized to between 14 to 21 Kgf/cm$^2$. The pipe failed at a pressure of approximately 84 Kgf/cm$^2$. The mode of pipe failure was a rupture in the fiber-reinforcing component of the structural pipe wall. This pipe construction did not pass the test but displayed an improved resistance to the effects of the flame test when compared to the fiber reinforced pipe of Example No. 1.

EXAMPLE NO. 3

A fiber-reinforced pipe was constructed in a similar manner as that described for Example No. 1, except that the structural pipe wall thickness was approximately 0.38 cm. Additionally, the pipe was constructed having four fire resistant layers disposed around the outside surface of the structural pipe wall. The fire resistant layers were formed from the same materials as that described for Example No. 2. The fire resistant layers had a total wall thickness of approximately 0.33 cm.

The pipe was subjected to the above-identified test and showed no signs of water leakage at line pressure, showed slight signs of water leakage at a rate of approximately 0.016 m$^3$/h when pressurized to approximately 31.6 Kgf/cm$^2$. The pipe failed at a pressure of approximately 126 Kgf/cm$^2$. The mode of pipe failure was cracking in the resin matrix of the structural pipe wall and resulting leakage. No structural failure of the fiber reinforcement occurred. This example illustrates the improved heat resistance provided by two additional fire resistant layers when compared to Example No. 2.

EXAMPLE NO. 4

A fiber-reinforced pipe was constructed in a similar manner as that described for Example No. 1, except that the structural pipe wall thickness was approximately 0.36 cm. Additionally, the pipe was constructed having eight fire resistant layers disposed around the outside surface of the structural pipe wall. The fire resistant layers were formed from a Nexus material impregnated with the same resin as that described for Examples Nos. 2 and 3. The fire resistant layers had a total wall thickness of approximately 0.2 cm.

The pipe was subjected to the above-identified test and showed slight signs of water leakage at a rate of approximately 0.02 psig, showed signs of water leakage at a rate of approximately 0.04 m$^3$/h when pressurized to between 14 to 21 Kgf/cm$^2$. The pipe failed at a pressure of approximately 80 Kgf/cm$^2$. The mode of pipe failure was a rupture in the fiber component of the structural pipe wall. This example illustrates the relatively improved heat resistance afforded by the C-Veil fire resistant layers of Example No. 2, and demonstrates the improved heat resistance provided by the Nexus fire resistant layers when compared with the non-protected pipe of Example No. 1.

EXAMPLE NO. 5

A fiber-reinforced pipe was constructed having six layers of fiber-reinforced resin of the same fiber and resin components disclosed above for Example No. 1, and having a wall thickness of approximately 0.18 cm. Additionally, the pipe was constructed having four fire resistant layers disposed around the outside surface of the structural pipe wall. The fire resistant layers were formed from the same materials as that described for Example Nos. 2 and 3. The fire resistant layers had a total wall thickness of approximately 0.33 cm.

The pipe was subjected to the above-identified test and leaked water at a rate of approximately 0.032 m$^3$/h at line pressure, and leaked water at a rate of approximately 0.31 m$^3$/h when pressurized to between 14 to 21 Kgf/cm$^2$. The pipe failed at a pressure of approximately 35 Kgf/cm$^2$. The mode of pipe failure was a rupture in the fiber component of the structural pipe wall. When compared to Example No. 3, this example illustrates the improved heat resistance that is achieved when the structural pipe wall is formed from twelve rather than six fiber-reinforced resin layers.

EXAMPLE NO. 6

A fiber-reinforced pipe was constructed having twelve layers of a fiber-reinforced resin of the same fiber and resin components disclosed above for Example No. 1. The structural pipe wall had a wall thickness of approximately 0.38 cm. The pipe was constructed having two fire resistant layers disposed around the outside surface of the structural pipe wall. The fire resistant layers were formed from C-Veil impregnated with the same resin that was used to form the structural pipe wall. The fire resistant layers had a total wall thickness of approximately 0.18 cm.

The pipe was subjected to the above-identified test and showed no signs of water leakage at line pressure, and showed slight signs of water leakage at a rate of approximately 0.007 m$^3$/h when pressurized to between 14 to 21 Kgf/cm$^2$. The pipe failed at a pressure of approximately 112 Kgf/cm$^2$. The mode of pipe failure was cracking in the resin matrix of the structural pipe wall. No structural failure of the fiber reinforcement occured. This pipe construction displayed an improved resistance to the effects of the flame test when compared to the pipe of Example No. 2.

EXAMPLE NO. 7

A fiber-reinforced pipe was constructed in the same manner as that described for Example No. 6, having twelve layers forming the structural pipe wall. The pipe was constructed having four fire resistant layers disposed around the outside surface of the structural pipe wall. The fire resistant layers were formed from the same materials described for Example No. 6, having a total wall thickness of approximately 0.33 cm.

The pipe was subjected to the above-identified test and showed no signs of water leakage at line pressure, and showed slight signs of water leakage at a rate of approximately 0.009 m$^3$/h at a pressure of approximately 63 Kgf/cm$^2$. The pipe failed at a pressure of approximately 133 Kgf/cm$^2$. The mode of pipe failure was a rupture in the fiber component of the structural pipe wall. This pipe construction displayed an improved resistance to the effects of the flame test when compared to the pipe of Example No. 3.

EXAMPLE NO. 8

A fiber-reinforced pipe was constructed in the same manner as that described for Example Nos. 6 and 7, having twelve layers forming the structural pipe wall, and having a wall thickness of approximately 0.38 cm. The pipe was constructed having six fire resistant layers disposed around the outside surface of the structural pipe wall. The fire resistant layers were formed from the same materials described for Example Nos. 6 and 7, having a total wall thickness of approximately 0.45 cm.

The pipe was subjected to the above-identified test and showed no signs of water leakage at line pressure, and showed slight signs of water leakage at a rate of approximately 0.004 m$^3$/h at a pressure of approximately 60 Kgf/cm$^2$. The pipe failed at a pressure of approximately 161 Kgf/cm$^2$. The mode of pipe failure was discovered to cracking of the resin matrix of the structural pipe wall. No structural failure of the fiber reinforcement occurred. This example illustrates the improved heat resistance afforded by six fire resistant layers when compared to the fire resistant pipe of Example No. 7, having four fire resistant layers.

EXAMPLE NO. 9

A fiber-reinforced pipe was constructed in the same manner as that described for Example Nos. 6, 7 and 8, having twelve layers forming the structural pipe wall, and having a wall thickness of approximately 0.37 cm. The pipe was constructed having eight fire resistant layers disposed around the outside surface of the structural pipe wall. The fire resistant layers were formed from the same materials described for Example Nos. 6, 7 and 8, having a total wall thickness of approximately 0.55 cm.

The pipe was subjected to the above-identified test and showed no signs of water leakage at line pressure, and showed no signs of water leakage at a pressure of approximately 204 Kgf/cm$^2$. The pipe failed at a pressure of approximately 250 Kgf/cm$^2$. The mode of pipe failure was cracking of the resin matrix of the structural pipe wall. Again, no structural failure of the fiber reinforcement occurred. This example illustrates the improved heat resistance afforded by eight fire resistant layers when compared to the fire resistant pipe of Example No. 8, having six fire resistant layers.

EXAMPLE NO. 10

A fiber-reinforced pipe was constructed in the same manner as that described for Example Nos. 6–9, having twelve layers forming the structural pipe wall, and having a wall thickness of approximately 0.37 cm. The pipe was constructed having a total of six fire resistant layers disposed around the outside surface of the structural pipe wall. The fire resistant layers comprise, moving outwardly away from the structural pipe wall, two layers of C-Veil, followed by two layers of Nexus, followed by two layers of C-Veil. The resin component for each of the fire resistant layers is the same as that used to form the structural pipe wall. The fire resistant layers have a total wall thickness of approximately 0.35 cm.

The pipe was subjected to the above-identified test and showed no signs of water leakage at line pressure, and showed slight signs of water leakage at a rate of approximately 0.025 m$^3$/h at a pressure of approximately 77 Kgf/cm$^2$. The pipe failed at a pressure of approximately 147 Kgf/cm$^2$. The mode of pipe failure was cracking of the resin matrix of the structural pipe wall. This example illustrates the improved heat resistance afforded by using a combination of different fire resistant layers when compared to the fire resistant pipe of Example No. 8, having six of the same type of fire resistant layers.

EXAMPLE NO. 11

A fiber-reinforced pipe was constructed in the same manner as that described for Example Nos. 6–10, having twelve layers forming the structural pipe wall, and having a wall thickness of approximately 0.41 cm. The pipe was constructed having a total of eight fire resistant layers disposed around the outside surface of the structural pipe wall. The fire resistant layers were all formed from the Nexus material immersed in the same resin component as that used to form the structural pipe, and had a total wall thickness of approximately 0.22 cm.

The pipe was subjected to the above-identified test and showed slight signs of water leakage at line pressure, and showed slight signs of water leakage at a rate of approximately 0.016 m³/h at a pressure of between 14 to 21 Kgf/cm². The pipe failed at a pressure of approximately 91 Kgf/cm². The mode of pipe failure was a rupture in the fiber component of the structural pipe wall.

EXAMPLE NO. 12

A fiber-reinforced structural pipe was constructed using the same fiber and resin components as that used in the previous examples. The structural pipe wall was formed from twelve layers of the fiber-reinforced resin and had a wall thickness of approximately 0.4 cm. The pipe was constructed having a total of eight layers of polyethylene disposed around the outside surface of the structural pipe wall. The polyethylene layers had a total wall thickness of approximately 1.2 millimeters. A total of four outside fiber-reinforced resin layers were formed from the same materials as the structural pipe wall, and were disposed around the outside surface of the polyethylene layer. The outside fiber-reinforced resin layers had a total wall thickness of approximately 0.13 cm. The pipe was subjected to the above-identified test and showed no signs of water leakage at line pressure, and no signs of leakage at twice the rated pressure (21 Kgf/cm²). The pipe showed first signs of leakage at approximately 108 Kgf/cm², leaking at a rate of approximately 31 m³/hr. The pipe failed at a pressure of approximately 715 Kgf/cm². The mode of pipe failure was a rupture in the fiber component of the structural pipe wall. This example illustrates the improved heat resistance afforded by using the polyethylene energy absorbing material layer in place of the fire resistant layer.

Although specific embodiments and examples of fire resistant pipes and pipe fittings have been described and illustrated, many modifications and variations will be apparent to those skilled in the art. It is, therefore, to be understood that, within the scope of the appended claims, fire resistant pipe and pipe fittings of this invention can be constructed other than as specifically described herein.

What is claimed is:

1. A fire resistant pipe comprising:
   a structural wall comprising layers of helically wound reinforcing fiber bonded with a siloxane-modified phenolic resin; and
   at least one fire resistant layer overlying the structural wall, wherein the fire resistant layer includes a fibrous carrier component impregnated with a siloxane-modified phenolic resin.

2. A fire resistant pipe as recited in claim 1 wherein the siloxane-modified phenolic resins selected to form the structural wall and the fire resistant layer are the same.

3. A fire resistant pipe as recited in claim 1 wherein the fire resistant layer comprises at least 75 percent by weight resin.

4. A fire resistant pipe as recited in claim 1 wherein the fiber component used to form the structural wall is selected from the group consisting of glass, carbon, and combinations thereof.

5. A fire resistant pipe as recited in claim 1 wherein the fibrous carrier component used to form the fire resistant layer is selected from the group consisting of glass containing mat, chopped glass containing mat, nylon containing mat, polyester containing mat, and combinations thereof.

6. A fire resistant pipe as recited in claim 1 wherein the helically wound reinforcing fiber comprises in the range of from 10 to 40 percent by weight resin.

7. A fire resistant pipe as recited in claim 1 wherein the fire resistant layer comprises in the range of from 75 to 95 percent by weight resin.

8. A fire resistant pipe comprising:
   a structural wall comprising layers of helically wound reinforcing fiber bonded with a phenolic resin; and
   at least one fire resistant layer overlying the structural wall, wherein the fire resistant layer includes a fibrous carrier component impregnated with a phenolic resin, wherein the fire resistant layer comprises at least three times the resin content as the helically wound reinforcing fiber forming the structural wall.

9. A fire resistant pipe as recited in claim 1 wherein the siloxane-modified phenolic resin comprises:
   a phenolic resole resin;
   a silicone intermediate; and
   a sufficient amount of catalyst to effect cure.

10. A fire resistant pipe as recited in claim 9 wherein the siloxane-modified phenolic resin is prepared by using in the range of from 0.5 to 35 percent by weight silicone intermediate.

11. A fire resistant pipe comprising:
    a structural wall comprising layers of helically wound reinforcing fiber bonded with a resin selected from the group consisting of phenolic resins, siloxane-modified phenolic resins, furan resins, and mixtures thereof;
    at least one fire resistant layer overlying the structural wall, wherein the fire resistant layer includes a fibrous carrier component impregnated with a resin selected from the group consisting of phenolic resins, siloxane-modified phenolic resins, furan resins, and mixtures thereof, and wherein the resin selected to form the fire resistant layer is compatible with the same as the resin selected to form the structural wall;
    a number of energy absorbing material layers interposed between the structural wall and the fire resistant layer.

12. A fire resistant pipe as recited in claim 1 wherein the energy absorbing material layer is formed from polyethylene.

13. A fire resistant pipe comprising:
    a plurality of layers of helically wound reinforcing fiber bonded with a siloxane-containing thermoset polymer; and
    at least one fire resistant layer overlying the helically wound layers comprising randomly oriented reinforcing fibers and substantially the same thermoset polymer as in the helically wound layers, wherein the polymer content of the fire resistant layer is 10 at least 75 percent by weight.

14. A fire resistant pipe comprising:
    a plurality of layers of helically wound reinforcing fiber bonded with a thermoset polymer selected from the group consisting of phenolic resins, siloxane-modified phenolic resins, furan resins, and mixtures thereof; and
    at least one fire resistant layer overlying the helically wound layers comprising randomly oriented reinforcing fibers and substantially the same polymer as in the helically wound layers, wherein the polymer content of the fire resistant layer is at least 75 percent by weight, and wherein the fire resistant layer is sufficiently thick to withstand a 1,000° C. flame for at least five minutes in a dry conditioned without degrading the structural wall.

15. A fire resistant pipe comprising:
    a plurality of layers of helically wound reinforcing fiber bonded with a thermoset polymer selected from the group consisting of phenolic resins, siloxane-modified phenolic resins, furan resins, and mixtures thereof; and at least one fire resistant layer overlying the helically wound layers comprising randomly oriented reinforcing fibers and substantially the same polymer as in the helically wound layers, wherein the polymer content of the fire resistant layer is at least 75 percent by weight, and wherein the thermoset polymer is a siloxane-modified phenolic resin prepared by combining:

a major proportion of phenolic resole or phenolic novolac resin;

a minor proportion of silicone intermediate; and a sufficient amount of catalyst to facilitate processing and effect cure.

16. A fire resistant pipe as recited in claim 15 wherein the catalyst is selected from the group consisting of organometallic compounds, amine compounds, acids, bases, and mixtures thereof.

17. A fire resistant pipe as recited in claim 16 wherein the catalyst is a mixture of organometallic and amine catalyst.

18. A fire resistant pipe as recited in claim 13 wherein the carrier component used to form the fire resistant layer is selected from the group of materials consisting of glass fibers, nylon fibers, polyester fibers, carbon fibers, and combinations thereof.

19. A fire resistant pipe as recited in claim 13 wherein the fire resistant layer comprises in the range of from 75 to 90 percent by weight resin.

20. A fire resistant pipe as recited in claim 19 wherein the helically wound reinforcing fiber comprises in the range of from 10 to 40 percent by weight resin.

21. A fire resistant pipe comprising:

a structural wall comprising layers of helically wound reinforcing fiber bonded with a resin selected from the group consisting of phenolic resins, siloxane-modified phenolic resins, furan resins, and mixtures thereof;

a number of energy absorbing material layers overlaying the structural wall, wherein the energy absorbing material is selected from the group consisting of materials capable of absorbing energy by phase transformation at a temperature below a degradation temperature of the structural wall; and a number of fiber-reinforced resin layers disposed over an outside surface of the energy absorbing material layers, wherein resin component is selected from the same group of resins used to form the structural wall.

22. A fire resistant pipe as recited in claim 21 further comprising:

a second number of energy absorbing material layers disposed over an outside surface of the fiber-reinforced resin layers, wherein the energy absorbing material used to form second number of energy absorbing material layers is selected from the group consisting of materials capable of absorbing energy by phase transformation at a temperature below a degradation temperature of the fiber-reinforced resin layers that are the same or different than that used to form the energy absorbing material layer overlaying the structural wall; and a second number of fiber-reinforced resin layers disposed over an outside surface of the energy absorbing material layers.

23. A fire resistant pipe as recited in claim 21 further comprising a second number of energy absorbing material layers interposed between the first number of energy absorbing material layers and the fiber-reinforced resin layers, wherein energy absorbing material used to form the second energy absorbing material layers is different from that used to form the first number of energy absorbing material layers.

24. A fire resistant pipe as recited in claim 21 wherein the energy absorbing material layer is formed from polyethylene.

25. A fire resistant pipe as recited in claim 21 wherein the resin selected to form the structural wall is the same as the resin selected to form the fiber-reinforced resin layers.

26. A fire resistant pipe as recited in claim 25 wherein the resin is selected from the group consisting of phenolic resole resins and phenolic novolac resins.

27. A fire resistant pipe as recited in claim 25 wherein the resin is a siloxane-modified phenolic resin prepared by combining:

a major proportion of phenolic resole or phenolic novolac resin;

a minor proportion of silicone intermediate; and a sufficient amount of catalyst to facilitate processing and effect cure.

* * * * *